United States Patent
Kim et al.

(10) Patent No.: US 11,339,286 B2
(45) Date of Patent: May 24, 2022

(54) THERMOPLASTIC RESIN COMPOSITION AND MOLDED ARTICLE USING SAME

(71) Applicant: LOTTE CHEMICAL CORPORATION, Seoul (KR)

(72) Inventors: Doo Young Kim, Uiwang-si (KR); Keehae Kwon, Uiwang-si (KR); Jungeun Park, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 174 days.

(21) Appl. No.: 16/769,711

(22) PCT Filed: Nov. 1, 2018

(86) PCT No.: PCT/KR2018/013209
§ 371 (c)(1),
(2) Date: Jun. 4, 2020

(87) PCT Pub. No.: WO2019/112183
PCT Pub. Date: Jun. 13, 2019

(65) Prior Publication Data
US 2020/0369874 A1    Nov. 26, 2020

(30) Foreign Application Priority Data

Dec. 5, 2017    (KR) .................. 10-2017-0166070

(51) Int. Cl.
*C08L 69/00*    (2006.01)

(52) U.S. Cl.
CPC ......... *C08L 69/00* (2013.01); *C08L 2205/025* (2013.01); *C08L 2205/035* (2013.01)

(58) Field of Classification Search
CPC .......... C08L 69/00; C08L 51/04; C08L 25/12; C08L 77/00; C08L 55/02
See application file for complete search history.

(56) References Cited

U.S. PATENT DOCUMENTS

| | | | |
|---|---|---|---|
| 5,959,042 A | 9/1999 | Bouilloux et al. | |
| 2008/0004373 A1 | 1/2008 | Volkers et al. | |
| 2015/0376402 A1 | 12/2015 | Kim et al. | |
| 2016/0185959 A1 | 6/2016 | Kim et al. | |

FOREIGN PATENT DOCUMENTS

| | | |
|---|---|---|
| CN | 101759984 A | 6/2010 |
| CN | 104610719 A | 5/2015 |
| JP | 3332056 B2 | 10/2002 |
| JP | 2005-171241 A | 6/2005 |
| KR | 10-1998-0042581 A | 8/1998 |
| KR | 10-2011-0068558 A | 6/2011 |
| KR | 10-1136732 B1 | 4/2012 |
| KR | 10-2014-0091722 A | 7/2014 |
| KR | 10-2016-0001922 A | 1/2016 |
| KR | 10-2016-0081794 A | 7/2016 |
| KR | 10-2017-0063123 A | 6/2017 |
| WO | 2019/112183 A1 | 6/2019 |

OTHER PUBLICATIONS

International Search Report in counterpart International Application No. PCT/KR2018/013209 dated Apr. 24, 2019, pp. 1-6.
Permanent Antistatic Polymer; http://www.inyourside.com/bbs/content.php?co_id=p03_a_en); dated May 8, 2020, with English translation, pp. 1-5.
GE Global Research Innovation Update—Plastics and Specialty Materials Innovations Jan. 21, 2003 (https://www.genewsroom.com/press-releases/ge-global-research-innovation-update-plastics-and-specialty-materials-innovations), pp. 1-3.

*Primary Examiner* — Mark S Kaucher
(74) *Attorney, Agent, or Firm* — Additon, Pendleton & Witherspoon, P.A.

(57) ABSTRACT

Disclosed are a thermoplastic resin composition comprising, based on (A) 100 parts by weight of a base resin comprising (A-1) 75 to 90 wt % of a polycarbonate resin, (A-2) 5 to 15 wt % of an acryl-based graft copolymer, and (A-3) 5 to 15 wt % of an aromatic vinyl-vinyl cyanide copolymer, (B) 5 to 20 parts by weight of a polyamide-polyalkylene glycol copolymer, and (C) 4 to 6 parts by weight of a cross-linked aromatic vinyl-vinyl cyanide copolymer, and a molded article made using the same.

11 Claims, No Drawings

THERMOPLASTIC RESIN COMPOSITION AND MOLDED ARTICLE USING SAME

CROSS-REFERENCE TO RELATED APPLICATIONS

This application claims priority to and the benefit of International Application No. PCT/KR2018/013209, filed Nov. 1, 2018, which published as WO 2019/112183 on Jun. 13, 2019, and Korean Patent Application No. 10-2017-0166070, filed in the Korean Intellectual Property Office on Dec. 5, 2017, the entire disclosure of each of which is incorporated herein by reference.

TECHNICAL FIELD

A thermoplastic resin composition and a molded article using the same are disclosed.

BACKGROUND ART

In general, an ABS resin, a copolymer of butadiene, styrene, and acrylonitrile, has excellent impact resistance, processability, and mechanical strength and thus is widely used for various fields of electricity, electronics, automobile, and the like. However, since a double bond of a butadiene rubber used for impact modifier of the ABS resin is broken by oxygen and ozone in the air, light, and the like, the ABS resin has a problem of drastic property deterioration, discoloring, and the like in terms of weather resistance. On the other hand, an acrylonitrile-styrene-acrylate copolymer (ASA) resin uses an acrylic rubber instead of the butadiene rubber and thus greatly improves the weather resistance, the biggest defect of the ABS resin and accordingly, exhibits less changes in terms of properties and appearance of a molded article than the ABS resin. Accordingly, the ASA resin replaces a painted article made from the ABS resin or a metallic material and thus is vastly used for outdoor uses.

However, the ASA resin has the above merits but is short of heat resistance and accordingly, needs to be improved with respect to the heat resistance in order to be used for a particular part requiring the heat resistance. This request may be met by a method of preparing an alloy thereof with a polycarbonate (PC) resin.

The PC/ASA alloy resin has recently been much used for automotive parts and the like. However, the PC/ASA alloy resin has problems of forming static charges through exterior friction, contact, and the like due to the intrinsic insulating characteristics and deteriorating appearance quality due to adhesion of impurities such as dirt in the air, and the like, which need to be improved.

DISCLOSURE

Technical Problem

It is to provide a thermoplastic resin composition having improved heat resistance, low gloss properties and antistatic properties, and a molded article using the same.

Technical Solution

According to an embodiment, a thermoplastic resin composition comprises, based on 100 parts by weight of a base resin comprising (A-1) 75 to 90 wt % of a polycarbonate resin, (A-2) 5 to 15 wt % of an acryl-based graft copolymer, and (A-3) 5 to 15 wt % of an aromatic vinyl-vinyl cyanide copolymer, (B) 5 to 20 parts by weight of a polyamide-polyalkylene glycol copolymer, and (C) 4 to 6 parts by weight of a cross-linked aromatic vinyl-vinyl cyanide copolymer.

The thermoplastic resin composition may further comprise (D) an acrylonitrile-butadiene-styrene graft copolymer.

The thermoplastic resin composition may comprise 1 to 5 parts by weight of the (D) acrylonitrile-butadiene-styrene graft copolymer based on 100 parts by weight of the base resin.

The (B) polyamide-polyalkylene glycol copolymer may be a polyamide-polyethylene glycol copolymer.

The (C) cross-linked aromatic vinyl-vinyl cyanide copolymer may be a cross-linked styrene-acrylonitrile copolymer.

The (B) polyamide-polyalkylene glycol copolymer may have a weight average molecular weight of 5,000 to 20,000 g/mol.

According to another embodiment, a molded article using the aforementioned thermoplastic resin composition is provided.

The molded article may have a surface resistance of $10^{11}$ to $10^{13} \Omega/\square$.

The molded article may have a gloss of 3 to 5 GU measured at a reflection angle of 60° using the ASTM D523 gloss measurement test method.

The molded article may have a thermal deflection temperature of 120 to 130° C. measured according to ASTM D648 heat deflection temperature test method.

The molded article may be an automobile interior component.

Advantageous Effects

Due to improved heat resistance, low gloss property, and antistatic property, the thermoplastic resin composition may be used to make a wide variety of molded products, painted and/or not-painted, for example, it may be usefully applied to molded products for automobile interior components, and the like to provide a molded article.

MODE FOR INVENTION

Hereinafter, embodiments of the present invention are described in detail. However, this is presented as an example, by which the present invention is not limited and the present invention is defined only by the appended claims.

According to an embodiment, a thermoplastic resin composition comprises, based on 100 parts by weight of a base resin comprising (A-1) 75 to 90 wt % of a polycarbonate resin, (A-2) 5 to 15 wt % of an acryl-based graft copolymer, and (A-3) 5 to 15 wt % of an aromatic vinyl-vinyl cyanide copolymer, (B) 5 to 20 parts by weight of a polyamide-polyalkylene glycol copolymer and (C) 4 to 6 parts by weight of a cross-linked aromatic vinyl-vinyl cyanide copolymer.

Hereinafter, each component of the thermoplastic resin composition is described in detail.

(A) Base Resin (A-1) Polycarbonate Resin

The polycarbonate resin is a polyester having a carbonate bond, is not particularly limited, and may be any polycarbonate that is usable in a field of resin composition.

For example, the polycarbonate resin may be prepared by reacting diphenols represented by Chemical Formula 1 with phosgene, halogenic acid ester, carbonate ester, or a combination thereof.

[Chemical Formula 1]

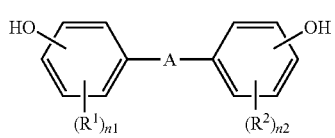

wherein Chemical Formula 1,

A is a linking group selected from the group consisting of a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, a carbonate ester group, CO, S, and $SO_2$, $R^1$ and $R^2$ are independently a substituted or unsubstituted C1 to C30 alkyl group or a substituted or unsubstituted C6 to C30 aryl group, and n1 and n2 are independently an integer ranging from 0 to 4.

Two or more types of the diphenols represented by Chemical Formula 1 may be combined to constitute a repeating unit of a polycarbonate resin.

Examples of the diphenols may be hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. For example, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, and/or 1,1-bis(4-hydroxyphenyl)cyclohexane may be used. For example, 2,2-bis(4-hydroxyphenyl)propane may be used.

The polycarbonate resin may be a mixture of copolymers obtained using two or more types of diphenols that differ from each other.

In addition, the polycarbonate resin may be a linear polycarbonate resin, a branched polycarbonate resin, a polyester carbonate copolymer resin, and the like.

Examples of the linear polycarbonate resin may be a bisphenol-(A) polycarbonate resin. Examples of the branched polycarbonate resin may be a polymer prepared by reacting a multi-functional aromatic compound such as trimellitic anhydride, trimellitic acid, and the like with diphenols and a carbonate. The polyester carbonate copolymer resin may be prepared by reacting bifunctional carboxylic acid with diphenols and carbonate, wherein the carbonate can be diaryl carbonate such as diphenyl carbonate and/or ethylene carbonate.

The polycarbonate resin may have a weight average molecular weight of 10,000 to 200,000 g/mol, for example 14,000 to 40,000 g/mol. When the weight average molecular weight of the polycarbonate resin is within the ranges, excellent impact resistance and flowability may be obtained. In addition, two or more types of polycarbonate resins having different weight average molecular weights may be mixed to satisfy desired flowability.

The polycarbonate resin may be included in an amount of 75 to 90 wt %, for example, 78 to 90 wt % based on 100 wt % of the base resin. When the polycarbonate resin is present in an amount less than 75 wt %, appearance characteristics may be not good, and when the polycarbonate resin is present in an amount more than 90 wt %, the mechanical strength may be reduced.

(A-2) Acryl-based Graft Copolymer

The acryl-based graft copolymer may be a core-shell type graft copolymer having a core of an acryl-based rubbery polymer and a shell of a copolymer of an aromatic vinyl compound and a vinyl cyanide compound. The acryl-based graft copolymer may be obtained by graft-copolymerizing a mixture of the aromatic vinyl compound and the vinyl cyanide compound into the acryl-based rubbery polymer. The polymerization may be any method known in the art without limitation, for example, a mass polymerization, a suspension polymerization, an emulsion polymerization, and the like.

For example, the acryl-based graft copolymer may be prepared by graft-copolymerizing 40 to 60 wt % of the mixture of the aromatic vinyl compound and the vinyl cyanide compound under 40 to 60 wt % of the acryl-based rubbery polymer in an emulsion polymerization method.

Herein, the acryl-based rubbery polymer may be an alkyl acrylate rubber or a copolymer rubber of the alkyl acrylate compound and the aromatic vinyl compound. For example, it may be a C2 to C10 alkyl acrylate rubber or a copolymer rubber of C2 to C10 alkyl acrylate and styrene.

In addition, the acryl-based rubbery polymer may have an average particle diameter ranging from 0.1 to 0.5 μm, for example, 0.1 to 0.3 μm. When the average particle diameter is less than 0.1 μm, impact resistance may be decreased, but when the average particle diameter is greater than 0.5 μm, coloring properties may be deteriorated.

The mixture of the vinyl cyanide compound and the aromatic vinyl compound graft-copolymerized into the acryl-based rubbery polymer may include 20 to 40 wt % of the vinyl cyanide compound and 60 to 80 wt % of the aromatic vinyl compound.

The vinyl cyanide compound may be acrylonitrile, methacrylonitrile, and fumaronitrile, and the like, and combinations thereof. For example, the vinyl cyanide compound may be acrylonitrile.

The aromatic vinyl compound may be styrene, C1 to C10 alkyl substituted styrene, halogen substituted styrene, vinyl toluene, vinyl naphthalene, and the like and combinations thereof. For example, the aromatic vinyl compound may be styrene.

The acryl-based graft copolymer may be included in an amount of 5 to 15 wt %, for example, 5 to 11 wt % based on 100 wt % of the base resin. When the acryl-based graft copolymer is present in an amount less than 5 wt %, a weld line may be formed on a molded article and thus deteriorate appearance characteristics, and when the acryl-based graft copolymer is present in an amount more than 15 wt %, antistatic properties may be deteriorated.

(A-3) Aromatic Vinyl-Vinyl Cyanide Copolymer

The aromatic vinyl-vinyl cyanide copolymer can be formed by copolymerizing a vinyl cyanide compound and an aromatic vinyl compound.

The vinyl cyanide compound may be acrylonitrile, methacrylonitrile, fumaronitrile, and combinations thereof.

The aromatic vinyl compound may be styrene, styrene substituted with halogen or C1 to C10 alkyl groups, α-methyl styrene, and combinations thereof.

The aromatic vinyl-vinyl cyanide copolymer may be a styrene-acrylonitrile copolymer (SAN).

The aromatic vinyl-vinyl cyanide copolymer according to an embodiment may be a copolymer of monomer mixtures comprising 50 to 90 wt % of an aromatic vinyl compound and 10 to 50 wt % of a vinyl cyanide compound, based on 100 wt % of the copolymer.

The aromatic vinyl cyanide copolymer may have a weight average molecular weight of 100,000 to 600,000 g/mol, for example 100,000 to 400,000 g/mol, for example 100,000 to 300,000 g/mol.

The aromatic vinyl-vinyl cyanide copolymer may be included in an amount of 5 to 15 wt %, for example, 5 to 11 wt % based on 100 wt % of the base resin. When the aromatic vinyl-vinyl cyanide copolymer is present in an amount less than 5 wt %, compatibility between the polycarbonate resin and the acryl-based graft copolymer may be poor, and thus mechanical properties may be lowered, and when the aromatic vinyl-vinyl cyanide copolymer is present in an amount more than 15 wt %, it may be difficult to process due to decreased flowability.

(B) Polyamide-Polyalkylene Glycol Copolymer

The polyamide-polyalkylene glycol copolymer can be a copolymer of polyamide and polyalkylene glycol.

For example, the polyalkylene glycol may include C1 to C10 alkylene groups and, without limitation, it may be polyethylene glycol.

The polyamide-polyalkylene glycol copolymer may have a weight average molecular weight of 5,000 to 20,000 g/mol, for example, 6,000 to 20,000 g/mol, for example, 7,000 to 18,000 g/mol.

The polyamide-polyalkylene glycol copolymer may be included in an amount of 5 to 20 parts by weight, for example, 10 to 15 parts by weight based on 100 parts by weight of the base resin. When the polyamide-polyalkylene glycol copolymer is present in an amount of out of the range, antistatic properties of the thermoplastic resin composition may be out of control, and accordingly, there may be a problem of dirt adhesion on the surface of a molded article and the like.

(C) Cross-linked Aromatic Vinyl-Vinyl Cyanide Copolymer

The cross-linked aromatic vinyl-vinyl cyanide copolymer may be obtained by copolymerizing a vinyl cyanide compound and an aromatic vinyl compound under the existence of a multi-functional vinyl-based compound.

The vinyl cyanide compound may be acrylonitrile, methacrylonitrile, fumaronitrile, and combinations thereof.

The aromatic vinyl compound may be styrene, styrene substituted with halogen or C1 to C10 alkyl groups, α-methyl styrene, and combinations thereof.

The multi-functional vinyl-based compound may be divinyl polydimethylsiloxane, vinyl modified dimethylsiloxane, divinylbenzene, ethylene glycol di(meth)acrylate, allyl (meth)acrylate, diallylphthalate, diallylmalate, triallylisocyanurate, and combinations thereof.

The cross-linked aromatic vinyl-vinyl cyanide copolymer may be a cross-linked styrene-acrylonitrile copolymer.

The cross-linked aromatic vinyl-vinyl cyanide copolymer may be included in an amount of 4 to 6 parts by weight based on 100 parts by weight of the base resin. When the cross-linked aromatic vinyl-vinyl cyanide copolymer is present in an amount of out of the range, low gloss properties may be deteriorated.

(D) Acrylonitrile-Butadiene-Styrene Graft Copolymer

The thermoplastic resin composition may further comprise an acrylonitrile-butadiene-styrene graft copolymer (g-ABS) in order to improve impact resistance.

The acrylonitrile-butadiene-styrene graft copolymer may be a core-shell type graft copolymer including a core of a butadiene-based rubbery polymer and a shell of a copolymer of acrylonitrile and styrene.

The rubbery polymer of the core component may improve impact strength at a low temperature, and the shell component is present on a continuous phase, for example, on the interface of the aromatic vinyl compound-vinyl cyanide compound copolymer and the rubbery polymer and thus may lower an interfacial tension and decrease particle size of a rubbery polymer in a dispersion phase and on the other hand, improve adherence on the interface.

The acrylonitrile-butadiene-styrene graft copolymer may be prepared by adding styrene and acrylonitrile to the butadiene-based rubbery polymer and then, graft-copolymerizing them in a common polymerization method of emulsion polymerization, bulk polymerization, and the like.

For example, a mixture of the styrene and the acrylonitrile in an amount of 40 to 60 wt % may be graft-copolymerized to 40 to 60 wt % of the butadiene-based rubbery polymer by using an emulsion polymerization method to prepare the acrylonitrile-butadiene-styrene graft copolymer.

The rubbery polymer of the acrylonitrile-butadiene-styrene graft copolymer may have an average particle diameter of 0.2 to 0.6 μm, for example 0.2 to 0.5 μm, for example, 0.3 to 0.5 μm.

In addition, the acrylonitrile-butadiene-styrene graft copolymer may be mixed with another acrylonitrile-butadiene-styrene graft copolymer including a rubbery polymer having a different average particle diameter therefrom. The acrylonitrile-butadiene-styrene graft copolymer may be included in an amount of 1 to 5 parts by weight based on 100 parts by weight of the base resin.

(E) Other Additives

The thermoplastic resin composition may further include additives optionally in accordance with its use. The additives may further include flame retardants, lubricants, plasticizers, heat stabilizers, antioxidants, light stabilizers, or colorants, and two or more types may be mixed in accordance with characteristics of final molded products.

The flame retardants are materials reducing combustibility and may include at least one from a phosphate compound, a phosphite compound, a phosphonate compound, polysiloxane, a phosphazene compound, a phosphinate compound, or a melamine compound, but is not limited thereto.

The lubricants play a role of lubricating the surface of a metal contacting with the thermoplastic resin composition during the process/molding/extrusion and thus helping a flow or movement of the resin composition.

The plasticizers may be generally used to increase flexibility, processability, or expansion property of the thermoplastic resin composition and may be any generally-used materials.

The heat stabilizers may suppress a thermal decomposition of the thermoplastic resin composition when kneaded or molded at a high temperature and may be any generally-used materials.

The antioxidants may suppress or block a chemical reaction of the thermoplastic resin composition with oxygen and thus prevent decomposition of the resin composition and loss of its inherent properties and include at least one of phenol-type, phosphate-type, thioether-type, or amine-type antioxidants, but is not limited thereto.

The light stabilizers suppresses or blocks decomposition of the thermoplastic resin composition from ultraviolet (UV) and thus its color change or mechanical property loss and, for example, may include at least one of hindered phenol-type, benzophenone-type, or benzotriazole-type light stabilizers, but is not limited thereto.

The colorant may include a general pigment or dye.

The additives may be included in an amount of 0.1 to 15 parts by weight based on 100 parts by weight of the base resin.

The thermoplastic resin composition may be prepared in a well-known method of preparing a resin composition.

For example, the thermoplastic resin composition may be manufactured into a pellet by mixing components and other additives simultaneously and melt/kneading the same in an extruder.

A molded product according to an example embodiment may be manufactured from the aforementioned thermoplastic resin composition. The thermoplastic resin composition exhibits excellent heat resistance, low gloss properties, and antistatic properties and accordingly, may be unlimitedly applied to a molded article requiring reduced adhesion of impurities such as dirt and the like in the air and luxurious appearance and, for example, applied to automotive interior components.

Hereinafter, the present invention is illustrated in more detail with reference to examples and comparative examples. However, the following examples and comparative examples are provided for the purpose of descriptions and the present invention is not limited thereto.

Hereinafter, the present invention is illustrated in more detail with reference to examples. These examples, however, are not in any sense to be interpreted as limiting the scope of the invention.

Examples 1 to 8 and Comparative Examples 1 to 7

The thermoplastic resin compositions according to Example 1 to 8 and Comparative Examples 1 to 7 were prepared according to the component amount ratios described in Table 1.

In Table 1, components (A-1, A-2, and A-3) of a base resin (A) were expressed by wt % with reference to a total weight of the base resin (A), and a polyamide-polyalkylene glycol copolymer (B), a cross-linked aromatic vinyl-vinyl cyanide copolymer (C), and an acrylonitrile-butadiene-styrene graft copolymer (D) added to the base resin were expressed by a part by weight unit based on 100 parts by weight of the base resin.

Each component shown in Table 1 were melt and kneaded in each amount shown in Table 1, extruded, and made into pellets. The extrusion was performed by using a twin-screw extruder having L/D=44 and a diameter of 35 mm, and a barrel temperature was set at 260° C.

The description of each component shown in Table 1 is as follows.

(A) Base Resin (A-1) Polycarbonate Resin

A bisphenol-A-based polycarbonate (PC) resin having a weight average molecular weight of 27,000 g/mol and made by Lotte Advanced Materials Co., Ltd. was used.

(A-2) Acryl-Based Graft Copolymer

An acrylonitrile-styrene-acrylate graft copolymer (g-ASA) including an acryl-based rubbery polymer having an average particle diameter of 0.3 μm in an amount of 50 wt % and made by Lotte Advanced Materials Co., Ltd. was used.

(A-3) Aromatic Vinyl-Vinyl Cyanide Copolymer

A styrene-acrylonitrile copolymer (SAN) resin including acrylonitrile in an amount of 24 wt %, having a weight average molecular weight of 113,000 g/mol, and made by Lotte Advanced Materials Co., Ltd. was used.

(B) Polyamide-Polyalkylene Glycol Copolymer

A polyamide-polyethylene glycol copolymer, IPE® U1 made by IonPhasE, was used.

(C) Cross-Linked Aromatic Vinyl-Vinyl Cyanide Copolymer

A cross-linked styrene-acrylonitrile copolymer, Blendex® BMAT made by Galata Chemicals LLC, was used.

(D) Acrylonitrile-Butadiene-Styrene Graft Copolymer

An acrylonitrile-butadiene-styrene graft copolymer (g-ABS) including a butadiene-based rubbery polymer having an average particle diameter of 0.3 μm in an amount of 45 wt % and made by Lotte Advanced Materials Co., Ltd. was used.

Properties Test

Injection-molded specimens according to Examples 1 to 8 and Comparative Examples 1 to 7 were evaluated with respect to heat resistance, antistatic property, and gloss property, and the results are shown in Table 2.

(1) Heat Resistance (° C.)

A ¼-inch thick specimen was measured with respect to a heat deflection temperature (HDT) under a load of 1.8 MPa according to ASTM D648.

(2) Antistatic Property (Ω/□)

A 30 mm×50 mm×3.2 mm-sized specimen was measured with respect to surface resistance by using a MCP-HT450 equipment manufactured by Mitsubishi Chemical Corp.

(3) Gloss Property (GU)

A grained surface of the 30 mm×50 mm×3.2 mm-sized specimen was measured with respect to gloss at a reflection angle of 60° by using a gloss meter according to ASTM D523.

TABLE 1

|     |       | Examples |    |    |    |    |    |    |    | Comparative Examples |    |    |    |    |    |    |
|-----|-------|----|----|----|----|----|----|----|----|----|----|----|----|----|----|----|
|     |       | 1  | 2  | 3  | 4  | 5  | 6  | 7  | 8  | 1  | 2  | 3  | 4  | 5  | 6  | 7  |
| (A) | (A-1) | 78 | 78 | 86 | 86 | 78 | 78 | 86 | 86 | 78 | 78 | 74 | 74 | 78 | 78 | 91 |
|     | (A-2) | 11 | 11 | 7  | 7  | 11 | 11 | 7  | 7  | 11 | 11 | 13 | 13 | 11 | 11 | 5  |
|     | (A-3) | 11 | 11 | 7  | 7  | 11 | 11 | 7  | 7  | 11 | 11 | 13 | 13 | 11 | 11 | 4  |
| (B) |       | 10 | 15 | 10 | 15 | 10 | 15 | 10 | 15 | —  | 10 | 10 | 15 | 8  | 20 | 10 |
| (C) |       | 5  | 5  | 5  | 5  | 5  | 5  | 5  | 5  | 5  | —  | 5  | 5  | 5  | 5  | 5  |
| (D) |       | 5  | 5  | 1  | 1  | —  | —  | —  | —  | 5  | 5  | 6  | 6  | 5  | 5  | 1  |

TABLE 2

|  | Examples | | | | | | | | Comparative Examples | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 | 6 |
| HDT (° C.) | 123 | 120 | 128 | 125 | 125 | 121 | 128 | 124 | 130 | 124 | 118 | 115 | 127 | 115 |
| Surface resistance ($\Omega/\square$) | $10^{13}$ | $10^{12}$ | $10^{13}$ | $10^{12}$ | $10^{13}$ | $10^{12}$ | $10^{13}$ | $10^{12}$ | Unmeasurable | $10^{12}$ | $10^{13}$ | $10^{12}$ | $10^{14}$ | $10^{11}$ |
| Gloss (GU) | 3.7 | 3.5 | 4.2 | 4.4 | 4.0 | 3.7 | 4.3 | 4.2 | 5.5 | 5.2 | 3.2 | 3.1 | 3.8 | 3.3 |

Referring to the results of Table 2, the thermoplastic resin compositions according to Examples 1 to 8 exhibited surface resistance of an expected range or less and thus excellent antistatic property as well as excellent heat resistance and low gloss. On the contrary, the thermoplastic resin compositions according to Comparative Examples 1 to 7 had weak property balance among heat resistance, low gloss property, and antistatic property.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. A thermoplastic resin composition, comprising
based on 100 parts by weight of a base resin comprising
(A-1) 75 to 90 wt % of a polycarbonate resin;
(A-2) 5 to 15 wt % of an acryl-based graft copolymer; and
(A-3) 5 to 15 wt % of an aromatic vinyl-vinyl cyanide copolymer,
(B) 5 to 20 parts by weight of a polyamide-polyalkylene glycol copolymer; and
(C) 4 to 6 parts by weight of a cross-linked aromatic vinyl-vinyl cyanide copolymer.

2. The thermoplastic resin composition of claim 1, wherein the thermoplastic resin composition further comprises an (D) acrylonitrile-butadiene-styrene graft copolymer.

3. The thermoplastic resin composition of claim 2, wherein thermoplastic resin composition comprises 1 to 5 parts by weight of the (D) acrylonitrile-butadiene-styrene graft copolymer based on 100 parts by weight of the base resin.

4. The thermoplastic resin composition of claim 1, wherein the (B) polyamide-polyalkylene glycol copolymer is a polyamide-polyethylene glycol copolymer.

5. The thermoplastic resin composition of claim 1, wherein the (C) cross-linked aromatic vinyl-vinyl cyanide copolymer is a cross-linked styrene-acrylonitrile copolymer.

6. The thermoplastic resin composition of claim 1, wherein the (B) polyamide-polyalkylene glycol copolymer has a weight average molecular weight of 5,000 to 20,000 g/mol.

7. A molded article using the thermoplastic resin composition of claim 1.

8. The molded article of claim 7, having a surface resistance of 1011 to 1013 $\Omega/\square$.

9. The molded article of claim 7, having a gloss of 3 to 5 GU measured at a reflection angle of 60° using the ASTM D523 gloss measurement test method.

10. The molded article of claim 7, having a thermal deflection temperature of 120 to 130° C. measured according to ASTM D648 heat deflection temperature test method.

11. The molded article of claim 7, wherein the molded article is an automobile interior component.

* * * * *